United States Patent
August et al.

(12) 
(10) Patent No.: US 6,399,665 B1
(45) Date of Patent: Jun. 4, 2002

(54) DRY EXPANSION OF EXPANDABLE POLYMER BEADS

(76) Inventors: Algis P. August, 6637 Eastridge Road, Mississauga, Ontario (CA), L5N 4L8; Casey P. August, 360 Riverside Ave., Greenwich, CT (US) 06878

( * ) Notice: Subject to any disclaimer, the term of this patent is extended or adjusted under 35 U.S.C. 154(b) by 0 days.

(21) Appl. No.: 09/696,442

(22) Filed: Oct. 25, 2000

(51) Int. Cl.⁷ ............................... C08J 9/22; C08J 9/36; C08J 9/38

(52) U.S. Cl. ..................... 521/58; 264/DIG. 9; 521/60; 522/160

(58) Field of Search ................... 521/58, 60; 522/160; 264/DIG. 9

(56) References Cited

U.S. PATENT DOCUMENTS

| | | | | |
|---|---|---|---|---|
| 3,023,175 A | * | 2/1962 | Rodman, Jr. .................. | 521/58 |
| 3,897,899 A | * | 8/1975 | Schuff et al. ................. | 264/51 |
| 3,959,189 A | * | 5/1976 | Kitamori ..................... | 521/60 |
| 5,114,640 A | * | 5/1992 | Harclerode et al. ........... | 521/53 |

\* cited by examiner

*Primary Examiner*—Morton Foelak

(57) ABSTRACT

Pre-expansion of expandable polystyrene (EPS) and other expandable polymer beads has long been carried out with heat of condensation from steam, which permeates the beads and deposits water droplets within expanding cells of each bead. Because long conditioning periods (to dry the pre-expanded beads) allow much of the blowing agent (e.g. pentane) to escape, the resultant pre-expanded beads often lack sufficient pentane to permit adequate final expansion when the pre-expanded beads are used to mold coffee cups and other articles. When conditioning periods are too short, excess water droplets often cause variations in bead fusing and even leaks in the molded product. The present invention avoids these long-standing problems by using a heated gas, such as air, to pre-expand the raw EPS beads through conduction only. The resulting pre-expanded beads differ from those pre-expanded with steam because thermal conduction enlarges peripheral cells more than interior cells in each bead, while steam acts by convection to permeate each bead (and condense within each cell), thereby expanding both peripheral and interior cells to substantially the same degree.

9 Claims, 2 Drawing Sheets

DRY EXPANSION OF EXPANDABLE POLYMER BEADS

CROSS-REFERENCE TO RELATED APPLICATION

The present application is related to U.S. patent application Ser. No. 09/696,321, filed on Oct. 25, 2000 to Algis P. August et al, entitled "Degradationion Of Expandable Polymer Bead Products", (Docket US-BD), which is incorporated herein by reference.

BACKGROUND OF THE INVENTION

This invention relate to expansion and pre-expansion of expandable polymers, such as expandable polystyrene (EPS) and expandable polyethylene.

As is well known, pre-expansion (partial expansion) of EPS beads is a preliminary step in the manufacture of various articles, such as foam coffee cups, insulating coolers, shape-molded packing for electronic products and the like. For this purpose, pre-expanded polymer beads are introduced into a mold through a filling valve. Within the the mold, the loosely packed beads are caused to expand further until they largely fill the space between the beads and mold surface as well as the spaces between the beads, thereby forming the manufactured article, which can be removed from the mold after cooling. Such processing is disclosed in prior art publications, such as U.S. Pat. No. 3,897,899 issued to Schuffet al on Aug. 5, 1975.

For over 25 years, pre-expansion of EPS beads has been carried out by using steam to provide the thermal energy to soften the unexpanded EPS crystal beads which contain a blowing agent such as pentane. Because steam is an efficient carrier of calories of thermal energy per unit mass, when intermixed with the crystal beads, it causes desirably rapid expansion thereof into much larger pre-expanded beads, each of which comprises a number of hollow cells. Each cell is formed of polymer cell walls, containing somewhat expanded pentane as well as water droplets from condensed steam. After a typically brief cooling period of less than an hour (to set the beads in their pre-expanded state) and a suitable "conditioning" period, the pre-expanded beads are next introduced into a mold for formation of a finished article. Conditioning also allows some of the pentane and condensed water vapour to escape through the cell walls to the surrounding atmosphere.

The purpose of the conditioning period (typically 8 to 24 hours) is both to allow the internal pentane pressure within cells and the atmospheric pressure to reach a steady state equilibrium (with concomitant increase in density) as well as to dry the pre-expanded beads sufficiently that condensed water vapour on the surfaces of these beads no longer agglomerates them into lumps that may not easily pass through the filling valve used in filling the mold or may not flow into corners and narrow spaces of the mold itself. Moreover, this conditioning period advantageously permits some of the water droplets (from condensed steam), that are inside the cells to escape through the cell walls thus drying the insides of the beads. Without inside drying, the trapped water droplets sometimes induce local non-uniformities in the molding of articles (e.g. holes in coffee cups) because each droplet requires longer heating to vapourize it before heating and expansion of the surrounding cell can progress. However, care must be taken that the conditioning period is not too long, as too much of the remaining blowing agent (e.g. pentane) may be lost by diffusion out of the cells of the pre-expanded beads, resulting in pre-expanded EPS beads that no longer have the ability to expand further when they are heated during molding. When the beads do not expand sufficiently during molding, the molded products tend to be poorly fused, and often crumble into pieces or, in the case of coffee cups, leak their contents. Thus, for many years, proper conditioning of pre-expanded beads has been a delicate balance between a sufficiently long time needed to dry the condensed steam introduced during pre-expansion, and a sufficiently short time to retain an adequate amount of blowing agent (e.g. pentane) within the pre-expanded beads.

SUMMARY OF THE INVENTION

It is now believed that the steam pre-expansion method functions by having the steam penetrate the crystal beads to carry a large thermal effect rapidly into the interior of each bead, where the steam condenses into water vapour, giving up most of its thermal energy by this change of state (at about 540 calories per gram of steam). In other words, it is the penetration of steam into the bead that allows efficient pre-expansion and formation of hollow cells containing thus-expanded pentane as well as water droplets from condensed steam, but this also causes the penetrated steam to condense into water vapor that is now deeply lodged within the cellular structure of each pre-expanded bead. Moreover, the interior cells near the center of each bead will be expanded by the thermal action of penetrated steam upon interior inclusions of blowing agent (e.g. pentane), thereby creating cells containing pentane which have thin interior cell walls that allow greater loss of pentane. This, in turn, gives rise to the delicate balancing required to maintain a conditioning period of the correct length.

In view of the very long history of using steam to provide heat to rapidly pre-expand EPS beads, it is a surprising, and somewhat contrarian, proposal of the present invention to use a less thermally efficient transfer medium in the form of a dry heated gas, such as air, to more slowly pre-expand the crystal polymer beads. It is believed that the use of hot, dry (low water moisture content) air as a media for transferring heat to the crystal beads causes the beads to heat up from the surface towards the center. Due to this slower action by the heated air, which does not readily carry calories into the interior cell structure of the crystal beads (as compared to steam, which provides most of its calories by change of state, rather than conduction), a conductive type of heating of the bead takes place. Dry heated air, which provides no latent heat of condensation (unlike the 540 calories per gram provided by steam), only transfers about 0.24 calories per gram per degree Celsius of temperature difference between the EPS bead and the heated air. It is believed that the outer layer of each bead is first heated by the hot air and that layer by layer the heat penetrates conductively inwardly (both by infrared radiation and by permeation of dry heated air inward from peripheral toward interior cells, together hereinafter sometimes called "conductive heating"), thereby forming a more pre-expanded structure (with thinner cell walls) on the peripheral (i.e. outer) surface of each bead, and a less expanded structure (with thicker cell walls) at the interior (e.g. center) of each bead. As a result, the pre-expanded beads produced by air heating, according to the present invention, contain a higher percent content of blowing agent (e.g. pentane) since it is locked within the interior cells of each bead by their surrounding thick walls of material which have not yet been heated by slow thermal conduction as much as the thin-walled peripheral (outer) cells. The resulting pre-expanded beads are advantageously very dry and can be used immediately in molding of containers and other EPS foam articles due to excellent flow characteristics and excellent expansion capability (due to high pentane content). In other words, the invention permits one to optionally dispense with the conditioning step in the preparation of EPS material for molding of foam articles.

Accordingly, the present invention broadly provides a method of expanding beads of expandable polymer, each bead comprising a mixture of polymer and a blowing agent. This novel method comprises the steps of:

a) heating a quantity of dry gas, b) maintaining the heated dry gas in contact with said bead until said bead is enlarged to a desired degree due to thermal expansion (primarily by conductive heating and without substantial condensation of the heated dry gas) of said blowing agent therein to form a plurality of both peripheral and interior, mutually joined, cells, each cell comprising said polymer and a quantity of blowing agent therein, and c) cooling the enlarged beads (as by terminating further contact thereof with the heated dry gas) to set their cells in an enlarged state thereof.

According to a preferred embodiment of the invention, the expandable polymer comprise expandable polystyrene, the gas comprises air, and the blowing agent comprises pentane.

Preferably, due the conductive nature of the heat applied by the heating gas, the aforesaid peripheral cells substantially surround and are substantially larger than said interior cells.

According to a preferred embodiment, heating step b) is carried out by:

i) circulating heated air at the bottom of a chamber, and ii) then introducing a batch quantity of said beads into said chamber while circulating said heated air therein to stir said beads.

In order to mold articles (e.g. foam coffee cups, forms for concrete, insulated coolers, from beads of expandable polymer (e.g. polystyrene, polyethylene, and the like), where each bead comprises a mixture of the polymer and a blowing agent (e.g. pentane, butane), the present invention provides a method comprising the steps of;

a) heating a quantity of dry gas (e.g. air having a low water moisture content), b) maintaining the aforesaid heated dry gas in contact with the aforesaid bead until the bead is partially enlarged to a desired degree due to thermal expansion (primarily by conductive heating and without substantial condensation of the heated dry gas) of the aforesaid blowing agent therein to form a plurality of both peripheral and interior, mutually joined, cells, each cell comprising the aforesaid polymer and a quantity of blowing agent therein, by:

i) circulating heated dry gas at the bottom of a chamber, and ii) then introducing a batch quantity of the aforesaid partially enlarged beads into the aforesaid chamber while circulating the heated gas therein to stir the beads, and c) cooling the beads (as by terminating further contact thereof with the heated dry gas) to set cells thereof in an enlarged state thereof to thereby form pre-expanded beads, d) introducing said pre-expanded beads into a mold defining a shape of an article, and e) heating the aforesaid pre-expanded beads in the aforesaid mold to further expand said pre-expanded beads to form the desired article.

Preferably, the aforesaid peripheral cells of the beads, that are introduced into the mold, substantially surround and are substantially larger than the aforesaid interior cells.

As a novel product, the present invention provides a pre-expanded bead of expandable polymer (e.g. polystyrene, polyethylene or the like) for molding articles therefrom, the aforesaid pre-expanded bead comprises a plurality of both peripheral and interior, mutually joined, cells, each cell comprising a cell wall of the polymer and a quantity of blowing agent (pentane, butane or the like) enclosed thereby, wherein the peripheral cells of the bead substantially surround and are substantially larger than the interior cells thereof. Preferably, the cell walls of interior cells are generally thicker than the cell walls of exterior cells.

The invention also provides an apparatus for expanding beads of expandable polymer (e.g. Polystyrene, polyethylene, or the like). The aforesaid apparatus comprises:

a) a vertical expansion chamber for receiving a selected batch quantity of the aforesaid beads, the aforesaid expansion chamber comprising a lower portion and an upper portion, the aforesaid lower portion being formed of gas-impermeable material, the aforesaid upper portion being formed of gas-permeable material, b) a loading bin for discharging the aforesaid selected batch quantity of beads into the aforesaid lower portion, c) a source of dry heated, pressurized gas (e.g. dry air) connected in gas-communicating relationship with the aforesaid lower portion, the aforesaid source being operable to direct the heated gas into the aforesaid lower portion of the chamber to stir and percolate through the aforesaid selected batch quantity of beads therein to cause heating thereof.

Preferably, the aforesaid source of heated dry air or other dry gas comprises a hot air blower having an output nozzle directed away from a vertical central axis of the aforesaid expansion chamber in order to cause more vigorous stirring of the beads. Of course, the hot air blower may draw air across a heat exchanger or the like before directing it into the lower portion of the chamber. According to a preferred embodiment of the novel pre-expansion apparatus, it may further comprise a sensor operable to detect a selected level of expanded beads within said expansion chamber as well as a discharge outlet in the aforesaid lower portion of the expansion chamber, the discharge outlet being openable to discharge expanded beads upon detection of the aforesaid selected level by said sensor.

BRIEF DESCRIPTION OF THE DRAWINGS

The foregoing discussion will be understood more readily from the following detailed description of the invention and preferred embodiments thereof, when taken in conjunction with the accompanying drawings, in which.

DETAILED DESCRIPTION

Figure 1A:
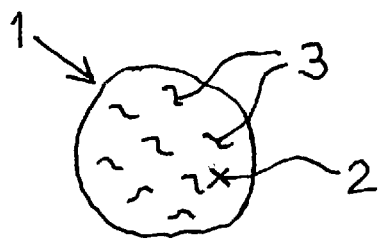
FIG. 1a is a schematic cross-sectional representation of an unexpanded bead of expandable polystyrene (EPS), in accordance with the prior art.

FIG. 1a shows an unexpanded ("crystal") bead 1 of expandable polymer. In the case where the polymer is polystyrene, such beads are typically called "EPS" (expandable polystyrene) beads and are available from a number of commercial sources; for example, EPS beads are sold under the designation F271T by Nova Chemicals Inc. of Moon Township, Pa., USA. While the preferred embodiment will be discussed with reference to polystyrene EPS beads, it should be understood that beads of other polymers, such as polyethylene, may be employed in carrying out the invention (see U.S. Pat. No. 3,959,189, issued May 25, 1976 to Kitamori).

Referring again to FIG. 1a, raw unexpanded bead 1 comprises a polystyrene material 2 intermixed with distributed deposits of a blowing agent such as pentane 3. As will be understood, numerous blowing agents may also be used, such as isopentane and n-pentane. Again, where a different polymer is used, such as polyethylene, as in Kitamori's U.S. Pat. No. 3,959,189 (supra), the blowing agent may be n-butane.

Figure 1B:
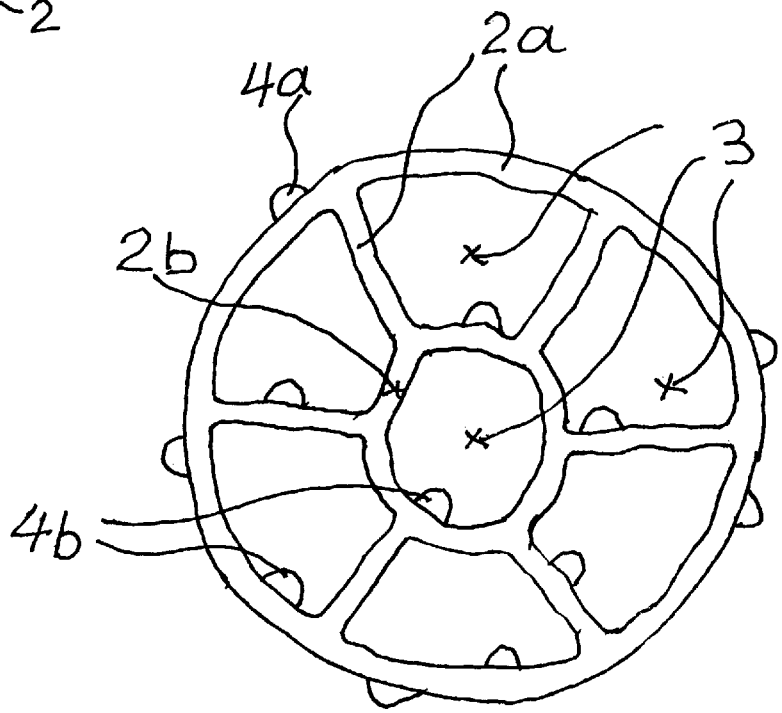
FIG. 1b is a schematic cross-sectional representation of a pre-expanded (partially expanded) bead of expandable polystyrene, in accordance with the prior art.

FIG. 1b illustrates a prior art pre-expanded EPS bead after expansion with steam, which provides heat rapidly to the bead 1 by releasing approximately 540 calories of thermal energy per gram of steam as it condenses to form water droplets 4a on the exterior periphery of bead 1 and water droplets 4b within the interior of bead 1. The heat causes expansion of pentane 3 to cause formation of a number of both peripheral cells and interior, mutually joined cells, surrounding quantities of expanded pentane 3 and water droplets 4b, created by condensation of steam which has permeated by convection thereof through the polymer material of bead 1 . As illustrated in FIG. 1b, peripheral cells have cell walls 2a, while interior cells have cell walls 2b. Because steam is effective to permeate throughout bead 1, both peripheral and interior cells are expanded to a similar degree, whereby peripheral cell walls 2a are of approximately the same thickness as interior cell walls 2b. Moreover, it is believed that much of the pentane 3 excapes from both both peripheral cells and interior cells during the conditioning period of many hours because of the substantially uniform thinness of all cell walls 2a and 2b. Of course, as pentane 3 escapes during conditioning, the ability of pre-expanded bead 1 to further expand (during formation of a coffee cup or other molded article) is greatly reduced. As explained earlier herein, the conditioning period is necessary to dry the bead until most of the exterior water droplets 4a have evaporated, in order to reduce the agglomeration of beads to an acceptable degree. However, because cell walls 2a, 2b act as barriers to the escape of water vapor, many interior water droplets 4b remain trapped within cells of bead 1 despite drying over an extended conditioning period. It is these interior water droplets 4b which are believed to cause subsequent problems during product molding, when they must first be sufficiently heated to their evaporation point in order to allow adjacent trapped pentane 3 to be sufficiently heated to expand adjacent polystyrene material of the surrounding cell walls 2a, 2b.

The present invention has been based on the foregoing understanding of the mechanisms involved in EPS bead pre-expansion. In particular, it has been realized that it is essential to eliminate the presence of water droplets 4b in order to reduce the occurrence of serious product defects due to local failures of beads to expand during molding of coffee containers and other articles, resulting in leaky cups and a dull, blemished surface appearance. As will be understood, these defects arise because of a combination of loss of pentane needed to fully expand the pre-expanded beads during product molding, and more directly because water interior water droplets 4b prevent uniform heating and expansion because they absorb heat needed for local expansion of pentane.

Moreover, while the quantity of exterior water droplets 4a can be reduced by drying during the conditioning period (to thereby reduce clumping pre-expanded beads and sieving them for wasteful discard to reduce clogging of molds and their filling valves), such conditioning causes much loss of pentane, which undesireably prevents full expansion of the pre-expanded beads during product molding.

Figure 1C:
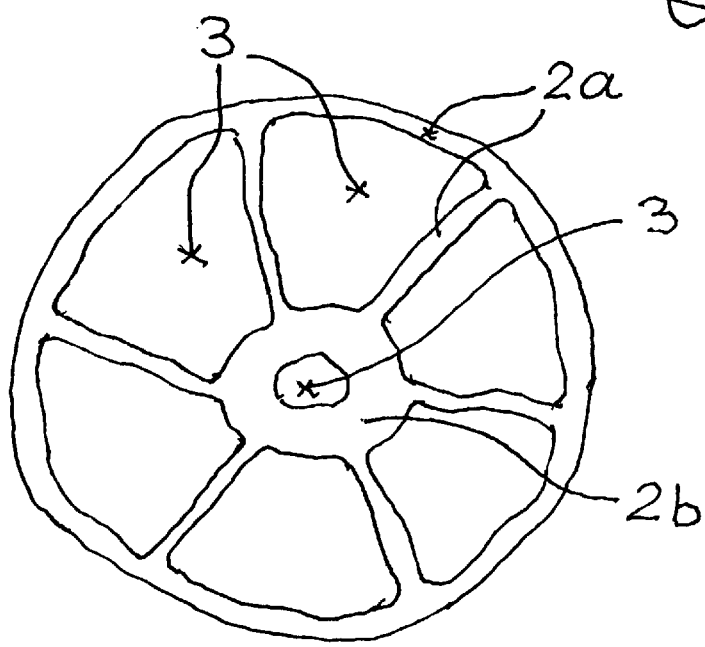
FIG. 1c is a schematic cross-sectional representation of a pre-expanded (partially expanded) bead of expandable polystyrene, in accordance with the present invention.

Because of these realizations, the present invention provides a solution that utilizes a heated dry gas to expand EPS and other expandable polymer beads, not only to pre-expand beads prior to final expansion during shaped product molding, but also to expand EPS beads to their fully expanded state (as typically used for filling "bean" bag furniture). By contrast with the prior art use of the heat released by steam condensation to permeate and rapidly transfer heat to expand EPS beads, the heated gas of the present invention acts primarily by conduction to more slowly heat the beads. In fact, as is well known, a gram of heated air can transfer only about one calorie of thermal energy for each degree of temperature difference between the air and the EPS beads, a reason why bead pre-expansion has been rigidly fixated on the use of steam. As a result of such conductive heating, the novel pre-expanded bead of FIG. 1c shows that peripheral deposits of pentane 3 (and their enclosing peripheral cells and peripheral cell walls 2a) are expanded first, while the pentane 3 enclosed within interior cells (and their defining interior cell walls 2b) are expanded last. Where, as in FIG. 1c, the expansion is stopped to form a pre-expanded bead before expansion of interior cells (by conductive heating) is complete, then peripheral cells are substantially more expanded (with thinner cell walls 2a) than interior cells (with thicker cell walls 2b). The thicker interior walls form a greater barrier to escape of the blowing agent (pentane 3) during conditioning, and otherwise, than the barrier formed by thinner polystyrene cell walls 2a of peripheral cells. As a result, the novel bead of FIG. 1c, because of the greater amount of pentane 3 retained within its thick-walled interior cells, retains a greater capability for further expansion during use in subsequent molding of coffee cups and other products than the prior art pre-expanded bead of FIG. 1b (whose interior cells have thin cell walls 2b). Moreover, because the gas used for heating is dry, far fewer (if any) condensed water droplets should be created within the bead cells of FIG. 1c than FIG. 1b, thereby permitting superior bead fusion and surface appearance after subsequent molding of the pre-expanded beads into finished products.

In the context of the present invention, a dry gas shall be understood to mean a gas that has a low water moisture content. Otherwise, any suitable gas, such as air, may be used for heating EPS beads during expansion. Obviously, toxic and otherwise noxious gases should be not be chosen as heating gases.

Figure 2A:
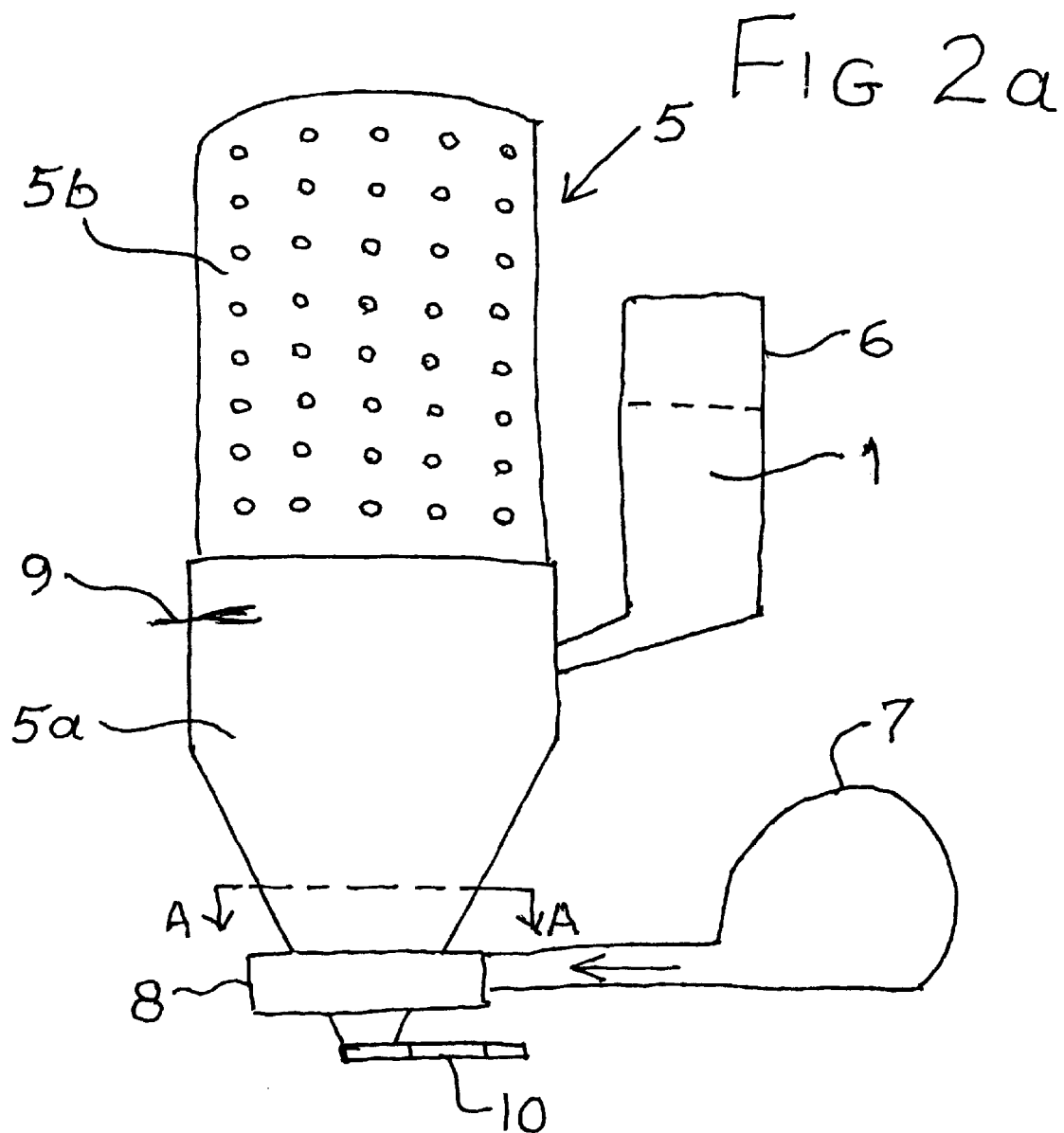
FIG. 2a is a schematic cross-sectional view of an apparatus for expanding beads of expandable polystyrene, in accordance with the present invention.
Figure 2B:
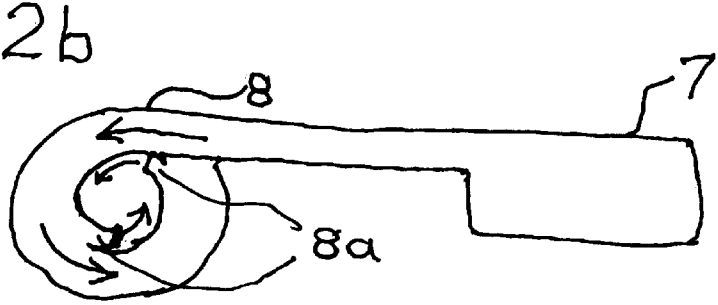
FIG. 2b is a schematic view of the apparatus of FIG. 2a, taken along section A—A thereof.

FIG. 2a and FIG. 2b show a novel apparatus in accordance with the present invention which may be used for expanding beads of expandable polymer (e.g. polystyrene, polyethylene, or the like). The aforesaid apparatus includes a vertical expansion chamber 5 for receiving a selected batch quantity (e.g. 10 kg.) of EPS or other polymer beads from a loading bin 6. Expansion chamber 5 includes both a lower portion 5a and an upper portion 5b. The expansion apparatus includes a source, in the form of hot air blower 7 of dry heated, pressurized gas (e.g. air at 510 cubic feet per minute) which is connected in gas-communicating relationship with the bottom of lower portion 5a by means of nozzles 8a projecting into lower portion 5a from a doughnut-shaped collar 8. The air from blower 8 is typically at a low pressure (e.g. corresponding to a water column of 5 inches) and may be heated by blowing it over a heat exchanger (not shown) whose thermal energy is supplied by the least costly local energy source, such as natural gas.

Preferably, lower portion 5a is formed of stainless steel or other substantially gas-impermeable material to keep the heated air from escaping from chamber 5 until it has thoroughly stirred and percolated through the batch quantity of EPS beads at the bottom of lower portion 5a to conductively heat the beads until they begin to expand, with outer peripheral cells of the beads expanding first and gradually transmitting heat through to the interior cells, which expand less and later. To allow for subsequent escape of the heated air and lost pentane from chamber 5, its upper portion 5b is made of a gas-permeable material, such as stainless steel screening material.

Preferably, hot air blower 7 has an output nozzle directed away from a vertical central axis of the aforesaid expansion chamber in order to cause more vigorous stirring of the beads. As shown in FIG. 2b, blower 7 directs hot air into collar 8a which has nozzles 8a directed tangential to the surface of lower portion 5a.

Moreover, the apparatus of FIG. 2a is provided with a sensor 9, capable of detecting a selected level of expanded beads within expansion chamber 5, as well as a discharge outlet 10, which is located at the bottom of lower portion 5a of the expansion chamber. While a variety of suitable sensors may be used, the preferred type is a vibrating level switch ( in the form of a tuning fork) which is available from the Miltronics Manufacturing Inc. of Keene, N.H., U.S.A. . As will be understood, the discharge outlet 10 is automatically opened to discharge expanded beads 1 upon detection of the aforesaid selected level by sensor 9. As will be understood, the expanded beads are either used without further processing (in bean bag chairs or the like) or are next introduced into a mold that defines a shape of an article. In the latter case, the partially expanded beads are heated in the mold to further expand them to form the article (e.g. foam coffee cup).

While the present invention has been described with reference to preferred embodiments thereof, numerous obvious changes and variations may readily be made by persons skilled in the field of expandable polymers. Accordingly, the invention should be understood to include all such variations to the full extent embraced by the claims.

What is claimed is:

1. A method of beads of expandable polymer, each bead comprising a mixture of polymer and a blowing agent, said method comprising the steps of;

a) heating a quantity of dry gas, b) maintaining the heated dry gas in contact with said bead until said bead is enlarged to a desired degree due to thermal expansion of said blowing agent therein to form a plurality of both peripheral and interior, mutually joined, cells, each cell comprising said polymer and a quantity of blowing agent therein, and c) cooling the enlarged beads to set said cells thereof in an enlarged state thereof.

2. A method as set forth in claim 1, said expandable polymer comprising expandable polystyrene, said gas comprising air, and said blowing agent comprising pentane.

3. A method as set forth in claim 1, said peripheral cells substantially surrounding and being substantially larger than said interior cells.

4. A method as set forth in claim 2, said peripheral cells substantially surrounding and being substantially larger than said interior cells.

5. A method as set forth in claim 4, wherein step b) is carried out by:

i) circulating heated air at the bottom of a chamber, and ii) then introducing a batch quantity of said beads into said chamber while circulating said heated air therein to stir said beads.

6. A method of molding articles from beads of expandable polymer, each bead comprising a mixture of polymer and a blowing agent, said method comprising the steps of;

a) heating a quantity of dry gas, b) maintaining the heated dry gas in contact with said bead until said bead is enlarged to a desired degree due to thermal expansion of said blowing agent therein to form a plurality of both peripheral and interior, mutually joined, cells, each cell comprising said polymer and a quantity of blowing agent therein, by:

i) circulating heated dry gas at the bottom of a chamber, and ii) then introducing a batch quantity of said beads into said chamber while circulating said heated gas therein to stir said beads, and c) cooling said beads to set cells thereof in an enlarged state thereof to thereby form pre-expanded beads, d) introducing said pre-expanded beads into a mold defining a shape of an article, and e) heating said pre-expanded beads in said mold to further expand said pre-expanded beads to form said article.

7. A method as set forth in claim 6, said gas comprising air, and said blowing agent comprising pentane.

8. A method as set forth in claim 6, said peripheral cells substantially surrounding and being substantially larger than said interior cells.

9. A method as set forth in claim 7, said peripheral cells substantially surrounding and being substantially larger than said interior cells.

* * * * *